No. 709,131. Patented Sept. 16, 1902.
M. J. ADAMS.
APPARATUS FOR MOLDING THE EXTERIOR OF ARTICLES IN CLAY OR OTHER PLASTIC MATERIAL.
(Application filed Dec. 3, 1901.)
(No Model.)
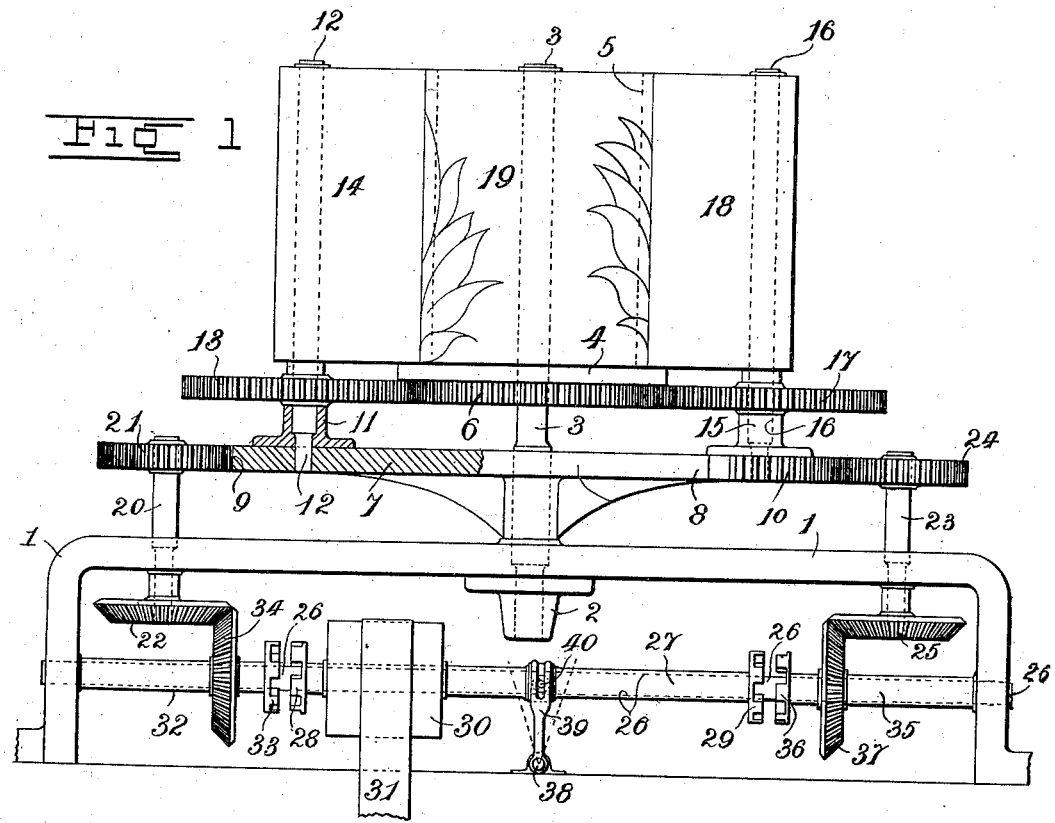
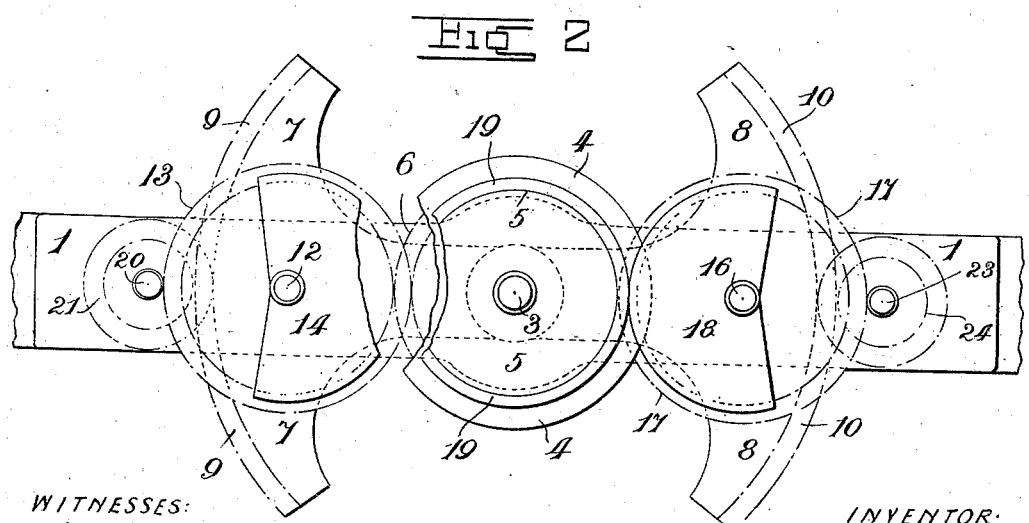
WITNESSES:
Fred White
Thomas T. Wallace
INVENTOR:
Moses James Adams,
By his Attorneys:
Arthur E. Dixon & Co.

UNITED STATES PATENT OFFICE.

MOSES JAMES ADAMS, OF LEEDS, ENGLAND.

APPARATUS FOR MOLDING THE EXTERIOR OF ARTICLES IN CLAY OR OTHER PLASTIC MATERIAL.

SPECIFICATION forming part of Letters Patent No. 709,131, dated September 16, 1902.

Application filed December 3, 1901. Serial No. 84,540. (No model.)

*To all whom it may concern:*

Be it known that I, MOSES JAMES ADAMS, sanitary engineer, of 72 Park Lane, Leeds, in the county of York, England, have invented Improvements in Apparatus for Molding the Exterior of Articles in Clay or other Plastic Material, of which the following is a specification.

This invention relates to apparatus for molding hollowed articles in clay or other plastic material of the kind described in the specification of United States Letters Patent No. 667,954, in which one or more molding-bodies having peculiarly-shaped molding-surfaces are used which press with a considerable amount of slip—*i. e.*, with a sliding or slipping motion—on the clay which is being operated upon. This slip is both necessary and advantageous in molding articles having a smooth surface; but this slip renders it very difficult to properly emboss or decorate an article during the molding thereof, because the slip tends to displace and destroy the said decoration.
Now my present invention has for its main object to enable me to produce hollowed articles decorated by embossing or recessing during the molding operation by eliminating so far as is necessary the slipping of the molding-surface of the molding-bodies over the clay. This object I accomplish in a sufficient degree by mounting the mold or die upon which or within which the article is formed on a table or other suitable support and causing the molding-body (or molding-bodies where more than one are used) to travel around the article. The molding body or bodies may be arranged horizontally, vertically, or obliquely; but in all cases I arrange that so far as possible the molding or forming surface of the molding body or bodies shall travel practically without slip over the surface it is desired to decorate. This motion of the molding body or bodies may be obtained in various ways.

The accompanying drawings illustrate by way of example a construction of apparatus according to the present invention comprising two molding-rollers traveling around the article to be molded.

Figure 1 is an elevation, partly in section, of the apparatus; and Fig. 2 is a plan of Fig. 1, portions of some parts being broken away to show the underlying mechanism.

1 1 are the framing of the machine, provided with a central footstep or bearing 2 for a vertical shaft 3. On this shaft is fixed a circular table or plate 4, which carries the core 5, that receives the clay forming the article to be molded. Below the table 4 is a toothed wheel 6, keyed on the shaft 3, and below the wheel 6 are two diametrically opposite quadrants 7 8, preferably formed in one piece, as shown, mounted to oscillate on the shaft 3 and provided, respectively, with teeth 9 10, the shaft 3 being fixed to the base 1. The quadrant 7 carries in a bearing 11 a vertical shaft 12, on which are fixed a toothed wheel 13 and a molding-body 14. The quadrant 8 carries similarly in a bearing 15 a vertical shaft 16, on which are fixed a toothed wheel 17 and a molding-body 18. The toothed wheels 13 and 17 gear with the wheel 6, and the molding-bodies 14 18 are each adapted to mold approximately one-half of the periphery of the clay 19 laid around the core 5.

The framing 1 1 of the machine carries at one end in a suitable bearing a vertical shaft 20, on the upper end of which is fixed a pinion 21, gearing with the teeth 9 of the other quadrant 7. On the lower end of the shaft 20 is fixed a bevel-wheel 22. At the opposite end of the framing 1 1 there is similarly mounted a vertical shaft 23, having fixed on its upper end a pinion 24, gearing with the teeth 10 of the quadrant 8, and on its lower end a bevel-wheel 25. The framing 1 1 of the machine also supports a fixed axle 26, which extends from end to end of the framing and carries a central sleeve 27, capable of rotating on and also sliding along the axle 26. This sleeve 27 is formed at its ends with clutch-faces 28 and 29, respectively, and intermediately with a pulley 30, driven by a belt 31. A rotary sleeve 32, mounted loose on the axle 26, near one end thereof, is formed with a clutch-face 33 and carries a bevel-wheel 34, gearing with the bevel-wheel 22 on the shaft 20. A similar rotary sleeve 35, mounted loose near the other end of the axle 26, is formed with a clutch-face 36 and carries bevel-wheel 37, gearing with the bevel-wheel 25 on the shaft 23. A rocking shaft 38, adapted to be operated by hand by suitable means, (not shown,)

carries a fork 39, engaging with a pin 40 on the sleeve 27, whereby the sleeve 27 can be slid along the axle 26 in one direction to bring the clutch-face 28 into engagement with the clutch-face 33, and thus drive the wheels 34 22, or in the other direction to bring the clutch-face 29 into engagement with the clutch-face 36, and thus drive the wheels 37 25. When the sleeve 27 is in its central disengaged position, (shown in the drawings,) the machine is at rest. Normally when the machine is in operation the sleeve 27 is in engagement with, say, the clutch 33. Then the motion of the pulley 30 is transmitted through the wheels 34 22, shaft 20, and pinion 21 to the quadrants 7 and 8, with the result that the core 5, with the clay 19 thereon, is held immovable on the fixed axis 3, while the molding-bodies 14 18, carried by the quadrants, are rotated around said axis. Simultaneously therewith the rotary motion of the quadrants 7 and 8 on the shaft 3 is also transmitted through the wheels 13 and 17 to the molding-bodies 14 18, so that the said molding-bodies while being carried around in a circle around the center of the core 5 as a common fixed axis are also rotated, respectively, on their own axes 12 and 16. The combination of the two rotary motions of the molding-bodies produces a rolling motion of their molding-surfaces at their points of contact with the periphery of the clay 19 on the core 5. To stop the molding operation, the sleeve 27 must be moved out of gear with the clutch 33. To reverse the motion of the machine—that is to say, to cause the molding-bodies 14 18 to travel back over the clay—the sleeve 27 must be moved into gear with the clutch 36. The toothed wheel 6 will vary in shape with the contour of the article to be molded. Thus the wheel 6 will be of circular shape, as shown, for molding a circular article, while an elliptical wheel will be employed in its place for molding an article of elliptical shape. The shape of the pitch-line of the teeth of the gear-wheels 13 and 17 will also vary correspondingly.

By suitably proportioning the several parts the rotary motion of the molding-bodies on their own axes may be made equal or nearly equal to the slip which would otherwise take place between the clay and the molding-surfaces of the bodies in a machine according to the aforesaid United States patent, and by this invention the slip is rendered practically inappreciable, so that a design incised in or raised on the said molding-surfaces will be accurately reproduced as an embossed or impressed decoration on the surface of the clay 19. Also the molding-bodies may be made to act on any desired proportions of the periphery of the clay.

Although two molding-bodies are shown in operation in the drawings, any desired number of molding-bodies may be employed, each mounted on a separate axle and each adapted to act upon a corresponding portion of the periphery of the clay. In some cases only one molding-body may be used, which is then arranged to travel in a complete circle around the clay. In such cases the quadrants are constructed as complete toothed wheels. The molding body or bodies may also be caused to travel in guides instead of working around a fixed center.

When dealing with an article of great length, and particularly when placed horizontally, a toothed wheel may be placed above and below the mold or at two opposite ends of the mold, the molding body or bodies being in such cases provided with a toothed wheel and quadrant at each end.

What I claim, and desire to secure by Letters Patent, is—

1. In apparatus for molding decorated articles in clay or other plastic material, the combination of a core for carrying the clay to be molded with a molding-body adapted to travel around said core, and means independent of the engagement of the molding-body with the clay for causing the molding-body to rotate on its own axis, whereby clay laid on said core is molded with a design by the said molding-body without appreciable slip, substantially as set forth.

2. In apparatus for molding decorated articles in clay or other plastic material, the combination of a core for carrying the clay to be molded with a plurality of molding-bodies each adapted to travel around said core and each adapted to mold a portion of the external shape of the article to be molded, and means independent of the engagement of said molding-bodies with the clay for causing the molding-bodies to rotate on their own axes, whereby clay laid on said core is molded on its external surface with a design by the said molding-bodies without appreciable slip, substantially as set forth.

3. In apparatus for molding decorated articles in clay or other plastic material, the combination of a core to receive the clay to be molded, a molding-body adapted to act upon the clay on said core, means for causing said molding-body to travel around said core, and positive engaging means connecting said molding-body with said core for causing said molding-body to rotate on its own axis while traveling around said core, whereby the clay on said core is molded by the said molding-body and a design formed on said molding-body is formed in said clay without appreciable slip, substantially as set forth.

4. In apparatus for molding decorated articles in clay or other plastic material, the combination of a core to receive the clay to be molded, a plurality of molding-bodies each adapted to act upon the clay on said core, means for causing said molding-bodies to travel around said core, and positive engaging means connecting said molding-body with said core for causing said molding-bodies to rotate each on its own axis while traveling around said core, whereby the clay on said core is molded by the said molding-bodies and designs formed on said molding-bodies are formed in said clay without appreciable slip, substantially as set forth.

5. In apparatus for molding articles in clay or other plastic material, the combination of a core for carrying the clay to be molded, a support for said core, a toothed wheel carried by said support, a molding-body for acting on the clay on the said core, a second support mounted to rotate about said core-support and carrying said molding-body, and a pinion for said molding-body carried by said second support and engaging with said toothed wheel, and means for rotating said second support, whereby when the latter is rotated the said molding-body will rotate on its own axis while traveling around the said core, substantially as set forth.

6. In apparatus for molding articles in clay or other plastic material, the combination of a core for carrying the clay to be molded, a support for said core, a toothed wheel carried by said support, a plurality of molding-bodies for acting on the clay on the said core, a second support mounted to rotate about said core-support and carrying said molding-bodies, and a pinion for each molding-body carried by said second support and engaging with said toothed wheel, and means for rotating said second support, whereby when the latter is rotated the said molding-bodies will rotate each on its own axis while traveling around the said core, substantially as set forth.

In witness whereof I have hereunto signed my name in the presence of two subscribing witnesses.

MOSES JAMES ADAMS.

Witnesses:
JOHN HY. WILLIAMSON,
JOSH. HY. WHITAKER.